(12) United States Patent
Takahashi et al.

(10) Patent No.: US 6,435,000 B1
(45) Date of Patent: Aug. 20, 2002

(54) METHOD FOR CALIBRATING SENSITIVITY OF ACCELERATION SENSOR

(75) Inventors: Hiroyuki Takahashi, Kasugai; Kazuyoshi Shibata, Mizunami; Hideki Andoh, Inuyama, all of (JP)

(73) Assignees: NGK Insulators, Ltd.; NGK Optoceramics Co., Ltd., both of Nagoya (JP)

( * ) Notice: Subject to any disclaimer, the term of this patent is extended or adjusted under 35 U.S.C. 154(b) by 0 days.

(21) Appl. No.: 09/528,132

(22) Filed: Mar. 17, 2000

(30) Foreign Application Priority Data

Mar. 19, 1999 (JP) .......................................... 11-076769
Mar. 14, 2000 (JP) ........................................ 2000-069885

(51) Int. Cl.[7] .............................................. G01P 3/44
(52) U.S. Cl. ...................................................... 73/1.38
(58) Field of Search ................................ 73/1.08, 1.15, 73/1.37, 1.38, 1.88

(56) References Cited

U.S. PATENT DOCUMENTS 5,117,696 A  6/1992 Schmid
5,365,799 A  11/1994 Okada 5,540,094 A * 7/1996 Varnham et al. ............. 73/1.37

FOREIGN PATENT DOCUMENTS

DE  1 432 879  4/1976
EP  0 731 357  4/1996
JP  4-82310  3/1992

* cited by examiner

Primary Examiner—Robert Raevis
(74) Attorney, Agent, or Firm—Burr & Brown

(57) ABSTRACT

The present invention provides a method for calibrating the sensitivity of an acceleration sensor device, which can suppress the sensitivity thereof in the direction of each of orthogonal axes other than that thereof in the direction of an orthogonal axis to be measured. This method is performed so as to calibrate the sensitivity of an acceleration sensor device which detects an acceleration by using an acceleration detecting device comprising a pair of piezoelectric elements. According to this method, when oscillations are applied to the acceleration sensor device, the absolute values of electrical outputs of the piezoelectric elements of the pair are brought close to each other by applying a voltage of a polarity, which is opposite to the polarity of polarization being already present therein, to the piezoelectric element, whose electric output has an absolute value larger than the absolute value of the electric output of the other piezoelectric element of the pair.

10 Claims, 8 Drawing Sheets

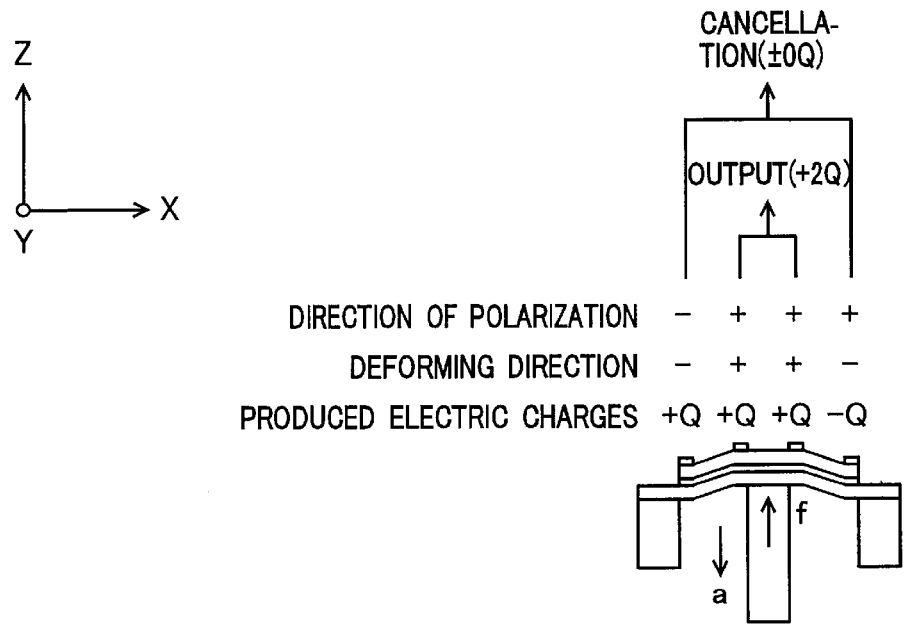
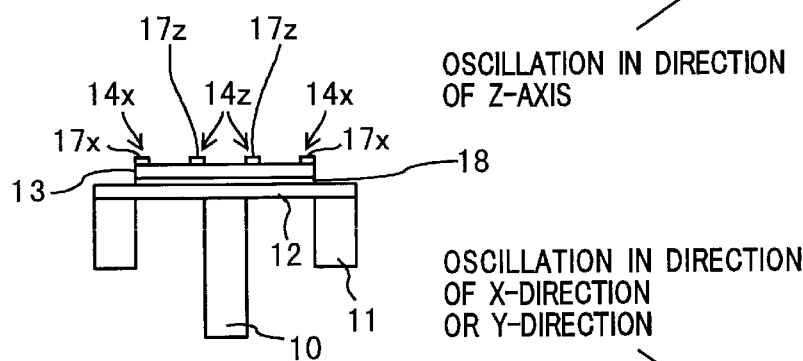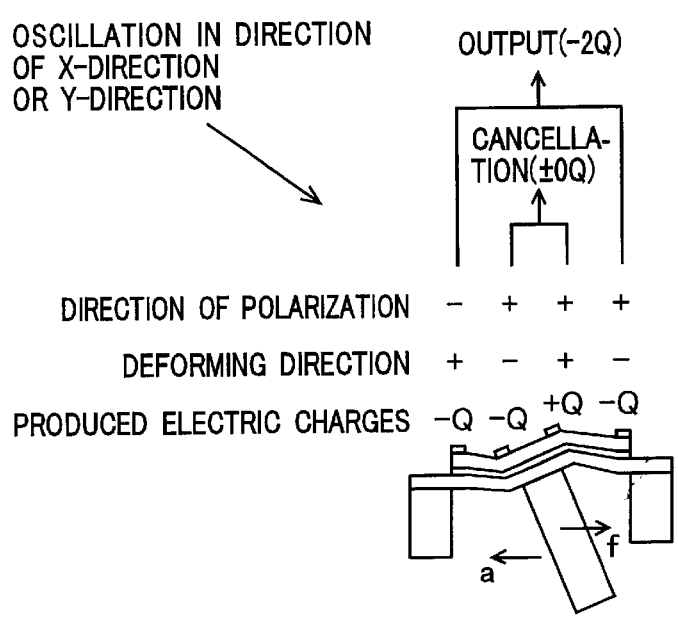

FIG. 6A
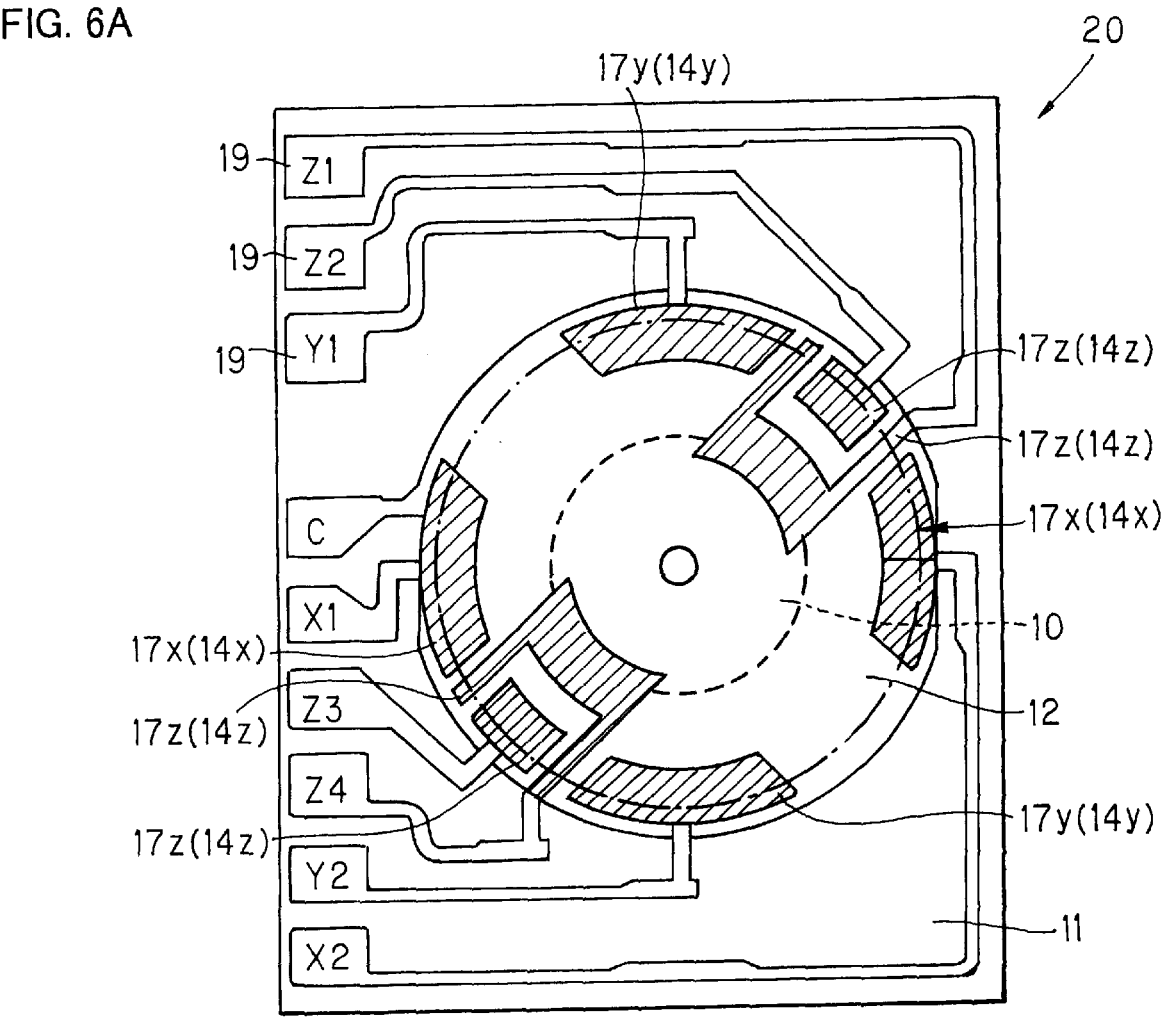
FIG. 6B
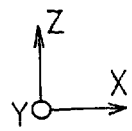
(Y: DOWNWARD DIRECTION PERPENDICULAR TO PAPER ON WHICH FIGURE IS DRAWN)
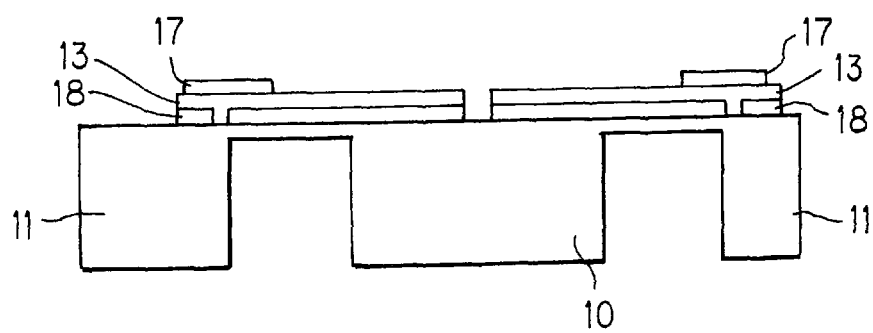

METHOD FOR CALIBRATING SENSITIVITY OF ACCELERATION SENSOR

BACKGROUND OF THE INVENTION

1. Field of the Invention

The present invention relates to a method for calibrating the sensitivity of an acceleration sensor device capable of detecting at least one of components, which respectively correspond to the directions of three orthogonal axes, namely, X-axis, Y-axis, and Z-axis, of an externally acting acceleration, which acts thereon, by using an acceleration detecting device consisting of a pair of piezoelectric elements.

2. Description of Related Art

In the automobile and machine industries, there has been an increase in demand for sensors capable of accurately detecting physical quantities, such as force, acceleration, and magnetism. Especially, compact sensors capable of detecting each of two-dimensional or three-dimensional components of such physical quantities are demanded.

For example, a sensor having a plurality of piezoelectric elements mounted on a flexible plate mounted on a flexible substrate having an operating member is disclosed in the Japanese Unexamined Patent Publication No. 5-26744.

This sensor is configured so that the flexible substrate deforms according to a physical quantity externally acting on the operating member. The direction and magnitude of the externally acting physical quantity are detected by a single sensor device in a three-dimensional manner on the basis of electric charges that are produced in the piezoelectric elements according to the strain due to the deformation of the flexible substrate.

This will be explained hereinbelow by taking an acceleration sensor, which has an operating member as a weight, as an example of such a sensor device. In the case that an externally acting acceleration a is exerted on the sensor device as illustrated in FIGS. 2A and 2B, an inertial force f acts on the weight 10 in a direction opposite to the direction of the acceleration a. This inertial force f causes the deformation of flexible substrate 12 put on the weight 10 and supports 11.

Electric charges are produced in the piezoelectric materials 13 according to the direction and magnitude of strain due to the deformation and according to the polarization direction and magnitude of the piezoelectric materials 13 put on the flexible substrate 12. Thus, the detection of the direction and magnitude of the externally acting acceleration is enabled by outputting the electric charges from upper electrodes 17x, 17y, and 17z, and a lower electrode 18 as electric signals.

The aforementioned acceleration sensor device is configured so that components of the externally acting acceleration, which respectively correspond to the directions of X-axis, Y-axis, and Z-axis, are detected by a single sensor device as components. As a result, for example, even when the weight 10 undergoes the influence of the acceleration only in the direction of Z-axis, as illustrated in FIG. 3B, the strain due to the deformation occurs not only in the piezoelectric element 14x for detecting X-axis component of the acceleration, but in the piezoelectric element 14y (not shown in FIG. 3B) for detecting Y-axis component of the acceleration. Consequently, electric charges are produced in the piezoelectric elements 14x and 14y.

The weight 10, however, does not undergo the influence of the acceleration only in the directions of X-axis and Y-axis, so that it is necessary to prevent electric outputs of the electric charges produced in the piezoelectric elements 14x and 14y from being electrically outputted therefrom.

Thus, the aforementioned acceleration sensor device employs a method of electrically canceling the produced charges by configuring the pair of piezoelectric elements as a single acceleration detecting device.

Practically, as illustrated in FIGS. 2A and 2B, an acceleration detecting device, which corresponds to each of X-axis, Y-axis, and Z-axis, of the acceleration sensor device comprises at least one pair of piezoelectric elements placed at positions that are symmetric with respect to the weight 10.

Because of the symmetric positions of the pair of piezoelectric elements with respect to the weight 10, the amounts of strain of these piezoelectric elements of the pair are almost equal to each other.

Polarization of the same magnitude is performed on the piezoelectric elements so that, among piezoelectric materials constituting the piezoelectric elements of the pairs, the piezoelectric materials to be used for detecting X-axis component and Y-axis component of the acceleration have opposite polarities, and that the piezoelectric materials to be used for detecting Z-axis component of the acceleration have the same polarity. Therefore, when the weight 10 is oscillated in the direction of Z-axis as illustrated in FIG. 3B, the electric charges of opposite polarities produced in the piezoelectric elements for detecting X-axis component and those (not shown) for detecting Y-axis component are canceled. Thus, no electric signals are outputted from these piezoelectric elements. On the other hand, when the weight 10 is oscillated in the directions of X-axis or Y-axis as illustrated in FIG. 3C, the electric charges produced in the piezoelectric elements 14z for detecting Z-axis component are canceled, so that no electric signals are outputted from these elements 14z.

However, sometimes, the quantities of electric charges to be produced in the piezoelectric elements of the pair are not equal to each other owing to defective conditions at the time of forming the piezoelectric elements, for instance, variation in the electrode area of the piezoelectric elements, variation in the dielectric constant of the piezoelectric elements, a deviation of the position of the weight, and variation in deformation caused by the strain of the flexible substrate.

In such a case, the electric charges produced in the piezoelectric elements of the pair are not completely canceled but outputted therefrom as electrical signals. Thus, for example, the sensitivity in the direction of X-axis is indicated despite the fact that the acceleration sensor device undergoes the influence of the acceleration only in the direction of Z-axis (hereunder, such sensitivity will be referred to as "noise sensitivity").

It is necessary for ensuring the reliability of the sensor to limit a ratio of the noise sensitivity to the sensitivity in the direction of an axis to be detected (hereunder, such sensitivity will be referred to as "principal axis sensitivity") within a predetermined range (for instance, if the principal axis sensitivity is 100%, the noise sensitivity should be equal to or less than 5%). On the other hand, it is very difficult to limit the noise sensitivity within the predetermined range in the process of manufacturing the acceleration sensor devices. Thus, there is the necessity for a method for calibrating the sensitivity of the sensor device after manufactured.

The present invention is accomplished in view of the aforementioned circumstances.

SUMMARY OF THE INVENTION

Accordingly, an object of the present invention is to provide a method for calibrating the sensitivity of an acceleration sensor device, according to which electrical outputs of piezoelectric elements of a pair of an acceleration detecting device are canceled and the aforementioned noise sensitivity is suppressed.

To achieve the foregoing object, according to the present invention, there is provided a method for calibrating the sensitivity of an acceleration sensor device capable of detecting an externally acting acceleration by at least one acceleration detecting device comprising a pair of piezoelectric elements. This method includes the steps of applying oscillation to said acceleration sensor device, and applying a voltage of a polarity, which is opposite to the polarity of polarization being already present therein, to one of the piezoelectric elements of the pair, whose electric output has an absolute value larger than an absolute value of an electric output of the other piezoelectric element of the pair. Thus, the absolute value of the electric output of one of the piezoelectric elements of the pair is brought close to that of the electric output of the other piezoelectric element of the pair.

According to the method for calibrating the sensitivity of an acceleration sensor device of the present invention, an acceleration sensor device comprising at least one acceleration detecting device may be employed as an acceleration sensor device having the sensitivity to be calibrated. This acceleration detecting device comprises a weight, supports each installed around the weight in such a way as to have a hollow portion, a flexible substrate put on the supports so that the weight is suspended in the hollow portion of each of the supports, and a pair of piezoelectric elements.

Further, according to the method for calibrating the sensitivity of an acceleration sensor device of the present invention, an acceleration sensor device comprising acceleration detecting devices respectively corresponding to two orthogonal axes among orthogonal X-axis, Y-axis, and Z-axis may be employed as an acceleration sensor device having sensitivity to be calibrated. Alternatively, according to the method for calibrating the sensitivity of an acceleration sensor device of the present invention, an acceleration sensor device comprising acceleration detecting devices respectively corresponding to three orthogonal X-axis, Y-axis, and Z-axis is employed as an acceleration sensor device having sensitivity to be calibrated.

The method for calibrating the sensitivity of an acceleration sensor device of the present invention, preferably, further comprises the steps of preliminarily calculating the relation among the value of the voltage, the time period, during which the voltage is applied to the piezoelectric element, and the magnitude of polarization changed by applying the voltage thereto when the voltage of the polarity opposite to the polarity of the polarization being already present therein, and determining the value of the voltage to be applied thereto, and the time period, during which the voltage is applied thereto.

Furthermore, the method for calibrating the sensitivity of an acceleration sensor device of the present invention may further comprise the step of simultaneously applying the voltage of the polarity, which is opposite to the polarity of the polarization being already present therein, to the piezoelectric element, whose electric output has an absolute value larger than an absolute value of an electric output of the other piezoelectric element of each of the pairs, and applying a voltage of the same polarity as the polarity of the polarization, which is already present, to the piezoelectric element, whose electric output has a smaller absolute value, of a corresponding one of the pairs by energizing all of the acceleration detecting devices.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIGS. 3A, 3B, and 3C are diagrams illustrating an operating state of the sensor device used in the method of the present invention;

FIG. 6A is a schematic top view showing the structure of the sensor device used in first and second embodiments of the present invention;

FIG. 6B is a schematic sectional view of the sensor device used in the first and second embodiments;

DESCRIPTION OF THE PREFERRED EMBODIMENTS

Figure 2A:
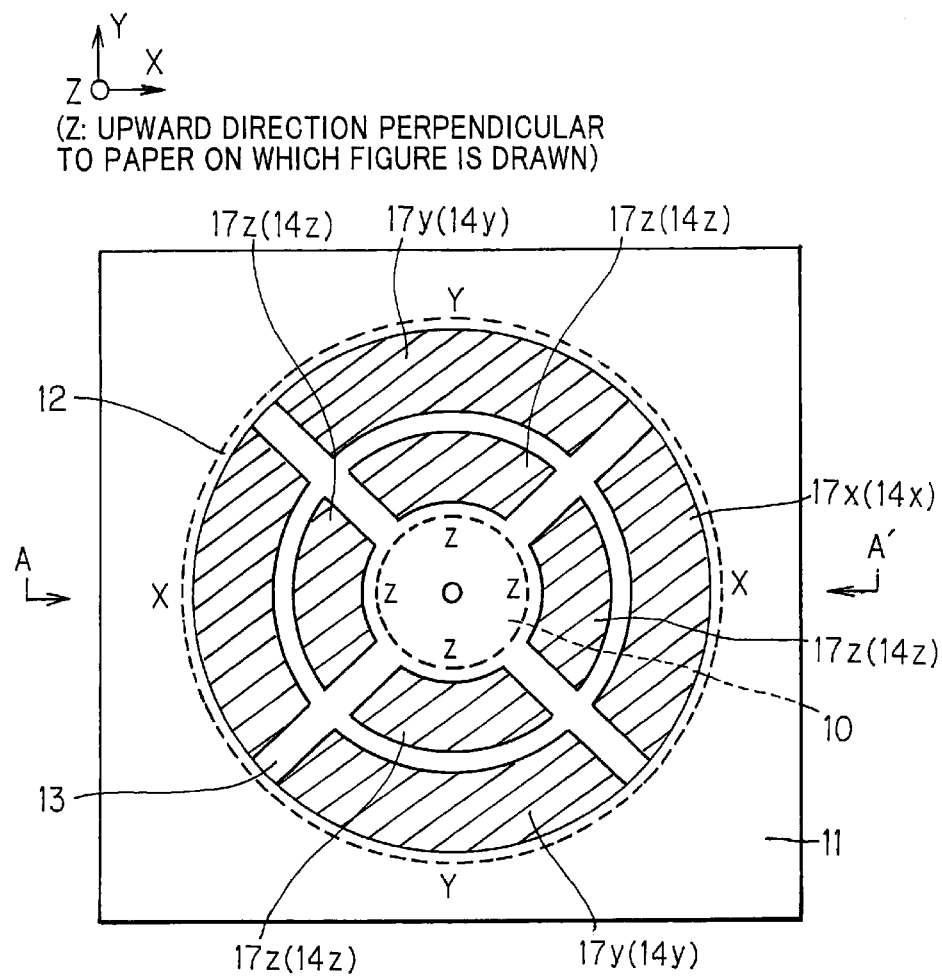
FIG. 2A is a schematic top view of an example of a sensor device used in the method of the present invention.
Figure 2B:
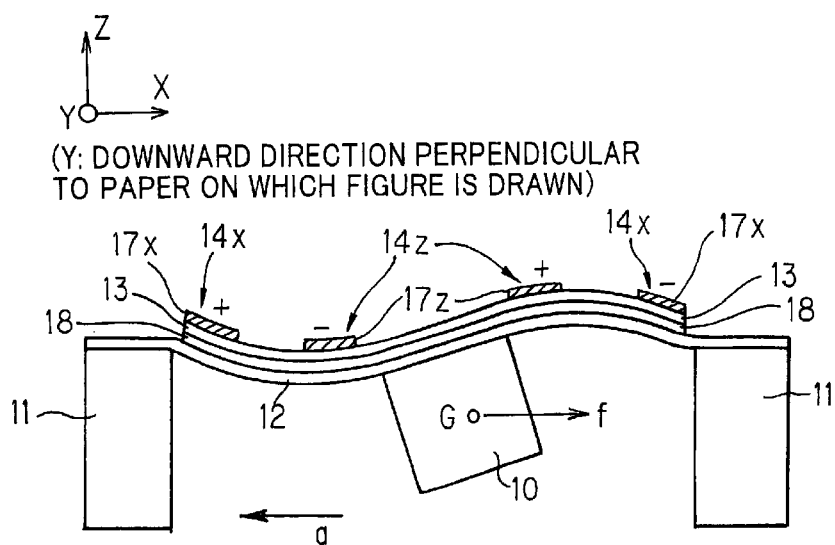
FIG. 2B is a sectional view taken on line A–A' of FIG. 2A.

An acceleration sensor device (hereunder referred to simply as a "sensor device") having sensitivity to be calibrated by the method of the present invention is, for example, a sensor device, which comprises a weight 10, supports 11 installed around the weight 10, the flexible substrate 12 put on the supports 11 installed in such a way as to be opposed and suspend the weight 10, and piezoelectric elements 14 each constituted by sandwiching a corresponding piezoelectric material between a pair of electrodes, as illustrated in FIGS. 2A and 2B.

The weight 10 of the sensor device is a member, which is suspended in such a manner as to have an upper end surface abutting against the flexible substrate 12 and which is operative to cause the deformation of the flexible substrate 12 by using a force generated according to the magnitude and direction of an externally acting acceleration. The weight 10 may be bonded to the flexible substrate 12 by an adhesive agent or the like. Alternatively, the weight 10 may be formed in such a way as to be integral with the flexible substrate 12. It is preferably from the viewpoint of symmetricity that the weight 10 is suspended at the central portion of the flexible substrate.

As long as the weight has a shape by which the weight can be suspended so that the upper end surface of the weight abuts against the flexible substrate, the shape of the weight is not limited to a specific form. The possible shapes of the weight include a circular cone and a different-diameter cylinder, whose outside-diameters change continuously or discontinuously, in addition to a cylindrical shape.

Incidentally, a cylindrical shape illustrated in FIGS. 2A and 2B is preferable in the high symmetricity thereof with respect to X-Y plane, as illustrated in FIGS. 2A and 2B.

The material of the weight is not limited to a specific one. However, it is preferable that the weight is made of ceramics, which have sufficient mass and high density and are insensitive to electromagnetic waves and have low coefficient of thermal expansion.

The supports 11 of the sensor device are members, installed around the weight 10, for supporting the flexible substrate 12 and the weight 10.

Therefore, as long as the supports 11 have the strength sufficient for supporting the flexible substrate 12 and the weight 10, the shape and material of each of the supports 11 are not limited to specific ones.

Incidentally, the shape of the supports, as illustrated in FIGS. 2A and 2B is preferable in that the supports are easy to machine and that the symmetricity thereof with respect to X-Y plane is relatively high. That is, preferably, the supports 11 have a quadrangular-prism-like appearance and a cylindrical hollow portion 16 and are made of ceramics, which are high in rigidity and insensitive to electromagnetic waves.

The flexible substrate 12 of the sensor device is a plate-like member that suspends the weight 10 and is put on the supports 11 opposed to each other and has piezoelectric elements. The entire flexible substrate may be constituted by piezoelectric materials.

As long as the flexible substrate has flexibility and is not broken when the weight 10 moves, the shape and material of the flexible substrate are not limited to specific ones. However, ceramics, which are high in Young's modulus and easily cause strain of piezoelectric materials, are preferable as the material of the flexible substrate. Regarding the shape of the flexible substrate, it is preferable from the viewpoint of easiness in machining the substrate that the flexible substrate is constituted by a single plate-like body 12.

On the flexible substrate, piezoelectric elements 14, each of which is constituted by a piezoelectric material sandwiched between a pair of electrodes, are disposed. Although piezoelectric ceramics, such as PZT, PMN, or PNN, or organic piezoelectric substances may be used as the piezoelectric materials, it is preferable to use PZT that excels in piezoelectric characteristics. The shape of the piezoelectric material is not limited to a specific one. For instance, a piezoelectric material 13 may be formed on the entirety of the top surface of the flexible substrate 12.

In the present specification, the term "piezoelectric element" is defined as an element for electrically detecting an externally acting acceleration, and indicates a portion of the piezoelectric material, which is sandwiched between a pair of electrodes (namely, upper and lower electrodes) in the upward or downward direction thereof.

Therefore, it is not always necessary that the upper electrode, the piezoelectric material, and the lower electrode are individually formed correspondingly to each of the piezoelectric elements. The piezoelectric elements 14x, 14y, and 14z may be produced by forming a lower electrode 18 and the piezoelectric material 13 on the entire top surface of the flexible substrate 12 and only partitioning the upper electrodes 17x, 17y, and 17z, as illustrated in FIGS. 2A and 2B.

The sensor device, to which the method for calibrating the sensitivity of an acceleration sensor device is applied, should have at least one acceleration detecting device consisting of a pair of piezoelectric elements, because the method for calibrating the sensitivity of an acceleration sensor device is to suppress the noise sensitivity by bringing the absolute values of electric outputs of the pair of piezoelectric elements close to each other. The pair of piezoelectric elements are placed at positions that are symmetric with respect to the weight 10 disposed on the flexible substrate.

Hence, it is sufficient that the sensor device of the present invention has at least an acceleration detecting device corresponding to one of three orthogonal axes, namely, X-axis, Y-axis, and Z-axis. However, the method for calibrating the sensitivity according to the present invention may be applied to an acceleration sensor device (hereunder referred to as "two-axis sensor device") having acceleration detecting devices respectively corresponding to two of the orthogonal X-axis, Y-axis, and Z-axis, or an acceleration sensor device (hereunder referred to as "three-axis sensor device") having acceleration detecting devices respectively corresponding to the three orthogonal axes, namely, X-axis, Y-axis, and Z-axis.

Each of these sensor devices can detect the direction and magnitude of an externally acting physical quantity in a two-dimensional or three-dimensional manner by synthesizing the physical quantity from acceleration components detected respectively corresponding to the orthogonal axes.

Incidentally, it is not always necessary that one acceleration detecting device is provided correspondingly to each of the orthogonal axes. For example, a plurality of acceleration detecting devices may be provided correspondingly to each of the axes. Alternately, a different number of acceleration detecting devices are provided correspondingly to each of the axes.

The sensor device of the aforementioned configuration is formed by performing a green-sheet stacking method as follows. That is, a plurality of green sheets each cut in such a way as to have a section of the shape, which is the same as of a section of the sensor device, are stacked. Then, such green sheets are compressed in such a manner as to be integral with one another. Subsequently, the laminated green sheets are sintered. Further, a small-sized high-sensitivity high-precision sensor device can be easily manufactured by forming the lower electrodes, piezoelectric materials, and upper electrodes by the application of thick film forming methods, such as a screen printing method, on the formed compact.

The method for calibrating the sensitivity of an acceleration sensor device according to the present invention is to calibrate the sensitivity of the acceleration sensor device by bringing the absolute values of electric outputs of piezoelectric elements of a pair of each acceleration detecting device close to each other when oscillations are applied to the acceleration sensor device. The electric outputs of the piezoelectric elements of the pair are more completely canceled by employing such a calibrating method. Thus, the suppression of the noise sensitivity of the sensor device is achieved. Hereinafter, the method for calibrating the sensitivity of the acceleration sensor device according to the present invention will be described in detail.

As described previously, the suppression of the noise sensitivity of the sensor device is achieved by canceling the electric outputs of the piezoelectric elements of the pair of the acceleration detecting device corresponding to the axis other than an excitation (or oscillation) axis.

Thus, it sufficient to perform a calibration, by which electric charges produced in the piezoelectric elements of the pair become equal to each other and/or which the electric outputs outputted therefrom based thereon become equal to each other.

Practically, as a method of controlling electric charges produced in the piezoelectric elements, there have been considered (1) a method of cutting a part of the electrode of each of the piezoelectric elements, and (2) a method of connecting a separate capacitive component (for instance, a capacitance) to a portion other than the piezoelectric elements. However, the present invention employs a method (hereunder referred to as a "polarization trimming" method) of controlling the electric charges themselves produced in the piezoelectric elements by reducing the polarizability of piezoelectric materials of one of the piezoelectric elements of the pair.

As compared with the method (1), the polarization trimming method is advantageous in that there is no need for machining the sensor device and thus, no cracks and defects, which would be generated when the device is machined according to the method (1), are produced. Further, as compared with the method (2), the polarization trimming method is advantageous in that the number of parts is small and the space, which would be necessary for placing the capacitive component according to the method (2), is not needed, and that thus, the sensor device itself can be reduced in size.

The polarization trimming method can be performed on the sensor device by effecting the following process. First, oscillations are applied to the sensor device by using one of X-axis, Y-axis, and Z-axis as the excitation axis. Then, the electric outputs of the acceleration detecting device corresponding to each of the axes other than the excitation axis are measured. Thus, for instance, when oscillations are applied to the sensor device in the direction of Z-axis, the sensitivity of the acceleration detecting device corresponding to X-axis or Y-axis, that is, the presence or absence of the noise sensitivity can be evaluated.

In the case that the presence of the noise sensitivity is detected, the amounts of the electric charges produced in the piezoelectric elements of the acceleration detecting device corresponding to the axis other than the excitation axis are different from each other. This means that the electric charges are not completely canceled. Therefore, there has been devised a method of canceling the electric charges produced in the piezoelectric elements of the pair by increasing the polarizability of the piezoelectric element having electric charges, whose amount is less than the amount of electric charges produced in the other piezoelectric element of the pair, to thereby increase the amount of the electric charge produced in the former piezoelectric element.

Incidentally, it is usual for increasing the sensitivity as much as possible to use the piezoelectric materials of the piezoelectric element when the piezoelectric materials are in a saturated-polarization state. Thus, the present invention employs a method of canceling the produced electric charges by reducing the polarizability of a piezoelectric element, which has produced electric charges, whose amount is larger than the amount of electric charges produced in the other piezoelectric element of the pair, thereby decreasing the amount of the electric charges produced in the former piezoelectric element.

Such a situation may occur not only in the case of using what is called the two-axis sensor device or the three-axis sensor device but in the case of using the sensor device that has only the acceleration detecting device corresponding to X-axis. That is, if the electric charges produced at the time of performing the excitation in the direction of Z-axis on the sensor device are not completely canceled, an electric output originated from such electric charges is outputted from the piezoelectric element. Thus, the sensitivity is indicated as if the sensor device was oscillated in the direction of X-axis. The method for calibrating the sensitivity according to the present invention can be used for suppressing the noise sensitivity of such a sensor device.

Incidentally, the electric output to be measured is, for example, the electric charge produced in the piezoelectric element or the voltage caused according to the produced electric charge. In this case, in view of the fact that electric charges are insensitive to the influence of the capacitive component, such as a lead wire, it is preferable that the produced electric charge is used as the electric output. However, in the light of the fact that the voltage can be relatively easily measured, it is preferable that the voltage is used as the electric output.

Subsequently, reverse-polarization processing is performed on the piezoelectric material constituting the piezoelectric element whose measured electric output has an absolute value is larger than the absolute value of the electric output of the other piezoelectric element of the pair. The polarizability of the piezoelectric material having undergone the reverse-polarization is lowered in comparison with the saturated polarizability, so that the amount of electric charge produced therein is decreased (namely, the sensitivity is lowered), even if the amount of strain in the piezoelectric element is equal to that of strain therein before the reverse or opposite polarization processing is performed. Thus, the noise sensitivity is suppressed still more by adjusting the amount of the electric charge produced therein to the amount of the electric charge produced in the other piezoelectric material whose electric output has a smaller absolute value.

The reverse polarization processing is achieved by applying a voltage of a polarity, which is opposite to that of polarization having been already present, to the piezoelectric element, whose electric output has a larger absolute value, of the pair.

The polarizability is reduced so that the amounts of electric charges produced in the piezoelectric elements of the pair become equal to each other, by performing a method of gradually increasing the voltage to be applied, but maintaining the time period, during which the voltage is applied, at a constant value, or performing a method of iteratively applying the voltage but maintaining the time period, during which the voltage is applied, at a constant value.

Incidentally, in the case of the method of the present invention, it is preferable to preliminarily calculate the relation among the value of the voltage, the time period, during which the voltage is applied to the piezoelectric element, and the magnitude of polarization changed by applying the voltage thereto when the voltage of the polarity opposite to the polarity of the polarization being already present therein. Further, it is desirable to determine the value of the voltage to be applied thereto, and the time period, during which the voltage is applied thereto, according to the preliminarily calculated relation thereamong.

Unless the polarization is reversed, the voltage value of the applied voltage, and the time period, during which the voltage is applied, are not limited to specific values. However, if the voltage to be applied thereto is too low, a long time expires until the polarizability reaches a desired value. Conversely, if the voltage to be applied is too high, a change in the polarizability is too large even though the polarization is not reversed. Thus, the time period, during the voltage is applied thereto, should be reduced to an extremely short time. Consequently, the amount of electric charge produced therein is sometimes difficult to control.

Further, according to the method of the present invention, the sensitivity of the sensor device may be calibrated by energizing the entire acceleration detecting device, instead of energizing the piezoelectric elements individually. Thus, the device can simultaneously perform the application of the voltage of a polarity opposite to that of the polarization, which is already present, to the piezoelectric element, whose electric output has a larger absolute value, of the pair and the application of the voltage of a polarity, which is the same as of the polarization, to the other piezoelectric element, whose electric output has a smaller absolute value.

Incidentally, the method for calibrating the sensitivity to the sensor device according to the present invention is to reduce the polarization in such a way as to bring the absolute values of the electric outputs of the piezoelectric elements of the pair close to each other. However, it is not always necessary to make the amounts of the electric charges produced in the piezoelectric elements completely equal to each other. That is, the difference between the amounts of the electric outputs of the piezoelectric elements of the pair should be suitably determined according to allowable noise sensitivity and cost efficiency. Usually, it is sufficient that the electric charges are canceled within a range, by which the noise sensitivity is suppressed in such a way as to be not more than 5% when the principal axis sensitivity is 100%.

On the other hand, if it is found that the electric outputs of the piezoelectric elements of the pair are not canceled to a sufficient extent, when the electric outputs thereof are measured after the calibration of the sensitivity, the absolute values of the electric outputs can be made to be closer to each other by performing similar calibration of the sensitivity again.

Furthermore, the polarization trimming processing as employed in the method for calibrating the sensitivity of the sensor device according to the present invention can be preferably used in the case that the sensor device is what is called the two-axis sensor device or the three-axis sensor device. This is because of the facts that all of the acceleration detecting devices of these sensor devices are placed on a single flexible substrate, and that the calibration of the sensitivity can be performed on all of the acceleration detecting devices at a time.

Practically, the reverse-polarization is performed by using a single probe card, in which thin-needle-like terminals are provided on a frame-like plastic in such a way as to protrude therefrom, and by placing such terminals at the positions of the electrodes of the piezoelectric elements to which the voltage should be applied. Thus, the polarization trimming operations respectively corresponding to X-axis, Y-axis, and Z-axis can be simultaneously performed. Such a method has advantages in that the number of times of performing the trimming operations, and the positioning of the probes is small.

Furthermore, the method for calibrating the sensitivity according to the present invention is very effective in the cases of (1) calibration of the noise sensitivity of each of the acceleration detecting device corresponding to X-axis and/or the acceleration detecting device corresponding to Y-axis when the sensor device is oscillated by using Z-axis as the excitation axis, and (2) calibration of the noise sensitivity of the acceleration detecting device corresponding to Z-axis when the sensor device is oscillated by using X-axis or Y-axis as the excitation axis.

This is because of the facts that the noise sensitivity of the cases (1) and (2) are large in comparison with those of (3) the acceleration detecting device corresponding to Y-axis when the sensor device is oscillated by using X-axis as the excitation axis and (4) the acceleration detecting device corresponding to X-axis when the sensor device is oscillated by using Y-axis as the excitation axis, and that the calibration of the noise sensitivity of these cases (1) and (2) can be effectively achieved.

Incidentally, the method for calibrating the sensitivity according to the present invention is applied to the calibration for suppressing the noise sensitivity. Thus, even after the calibration of the sensitivity performed according to the method of the present invention, the electric outputs of the acceleration detecting devices respectively corresponding to X-axis, Y-axis, and Z-axis may be different from one another in the case that the same acceleration is exerted on each of X-axis, Y-axis, and Z-axis.

In such a case, there is the necessity for performing another calibration so as to balance the electric outputs respectively corresponding to X-axis, Y-axis, and Z-axis by performing the process of controlling the amplification factor of the amplifier connected to each of the acceleration detecting devices, or the process of controlling the electric outputs by connecting a capacitor in parallel with each of the acceleration detecting devices.

Hereinafter, the method for calibrating the sensitivity according to the present invention will be explained in more detail by describing the preferred embodiments. Regarding each of these embodiments, an explanation will be given of the calibration of the noise sensitivity of the acceleration detecting device corresponding to X-axis in the case that the sensor device is oscillated by using Z-axis as the excitation axis.

Figure 5:
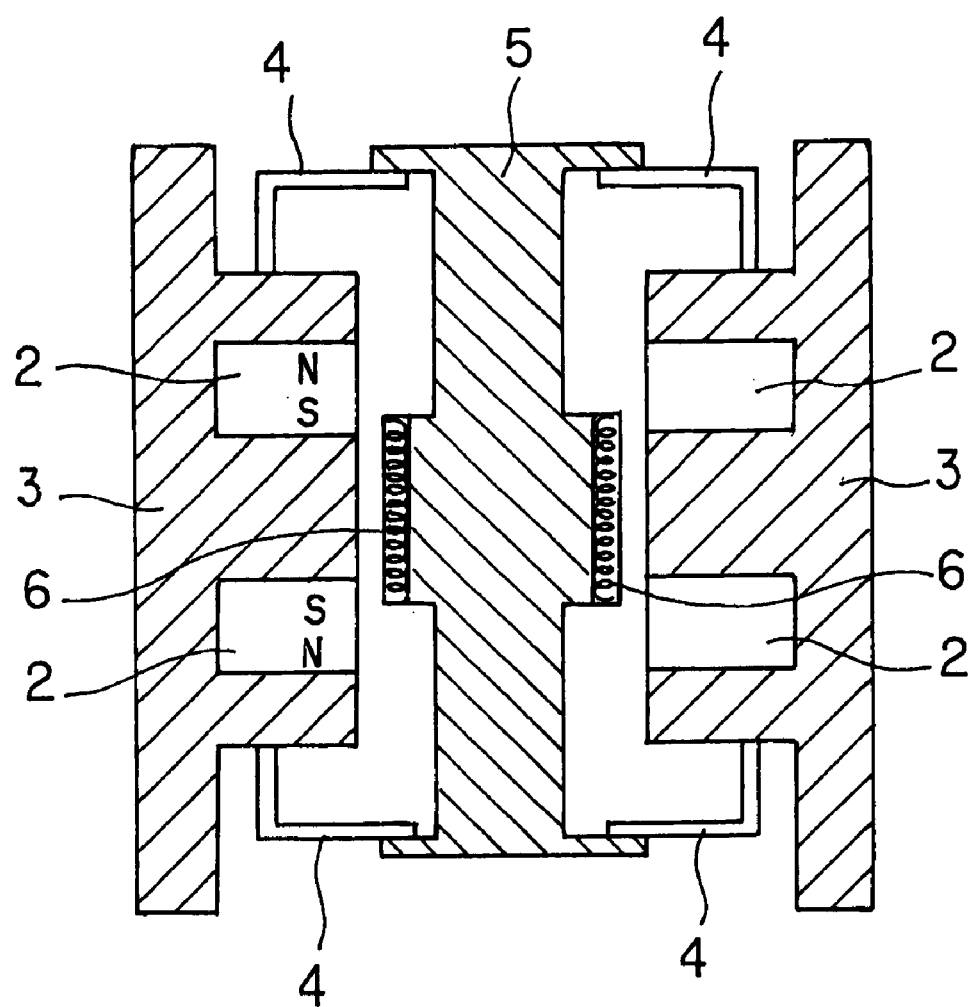
FIG. 5 is a schematic sectional view of an example of the vibration testing machine.

First, a vibration testing apparatus and a sensor device used in the case of this embodiment will be described hereinbelow. An electrodynamic vibration testing machine of a structure illustrated in FIG. 5 was used as the vibration testing apparatus.

First Embodiment

Regarding the first embodiment, the electric output of each of the piezoelectric elements of the pair of the acceleration detecting device was measured. Then, the calibration of the sensitivity was performed.

(i) Fixing of Sensor Device

Figure 4:
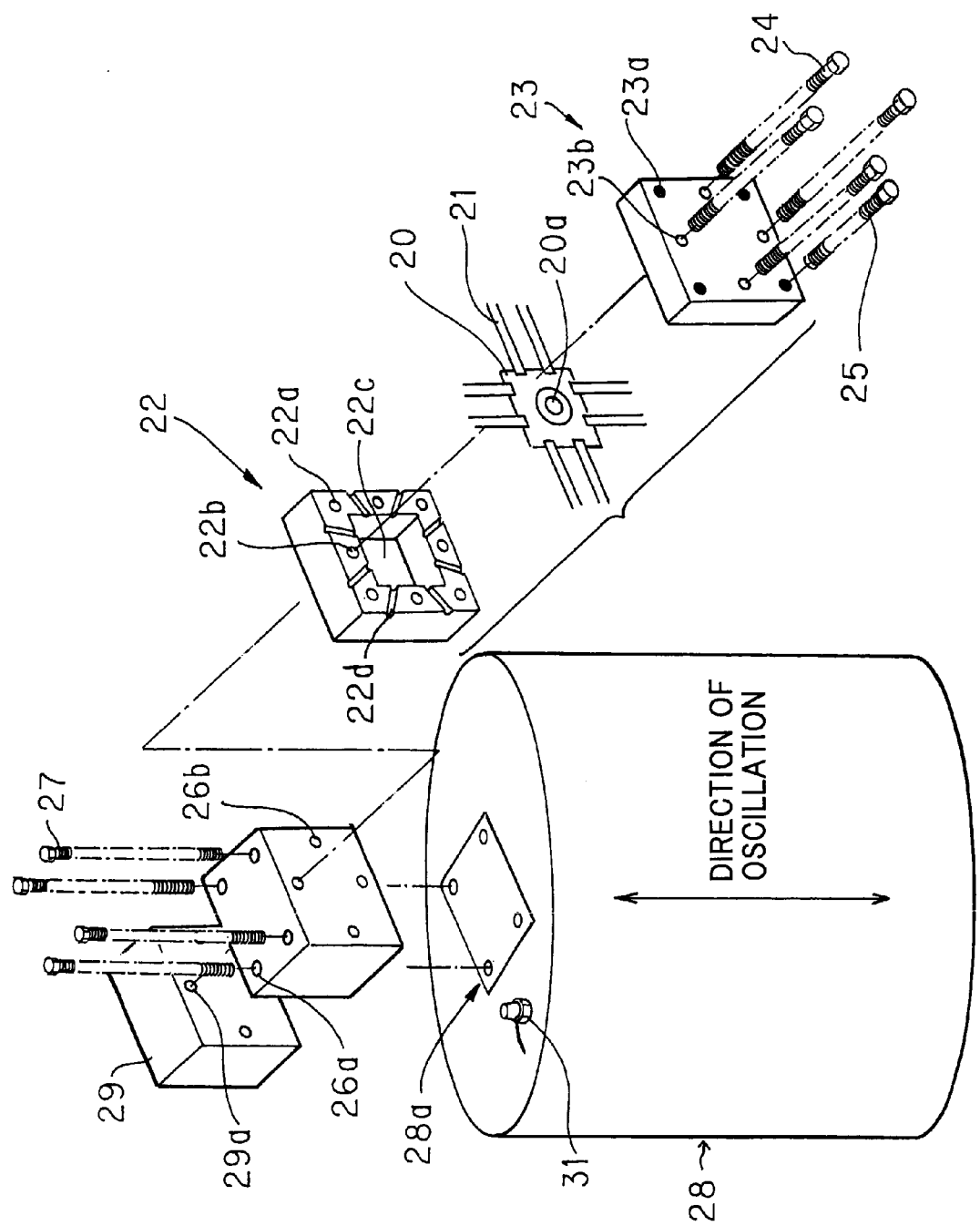
FIG. 4 is a schematic perspective diagram showing an example of a method of fixing the sensor device and a vibration testing machine.

The sensor device 20 was fixed by using jigs 22, 23, and 26, as shown in FIG. 4. The jig 22 was a case-like member having an opening portion 22c that is nearly of the same shape as the shape of the sensor element 20. The jig 22 had a narrow groove 22d for drawing out a coaxial line, and female screws 22a bored respectively in corner portions thereof, and holes 22b each having a clearance when a bolt is fitted thereto (hereinafter referred to as a clearance hole) each bored in the central parts of the side portions thereof.

The jig 23 was formed like a plate, and had clearance holes 23a, which were respectively bored in corner portions thereof, and clearance holes 23b, which were respectively bored in the central parts of side portions thereof, similarly as the jig 22. The jig 26 was a regular hexahedron having the same length of each side as a side of the jigs 22 and 23 and being provided with clearance holes 26a at four corners and female screws 26b in the center of each side.

Further, female screws 28a were formed in a vibrator 28 of the vibration testing machine. Moreover, a standard acceleration pickup 31 was fixed in the vicinity of the female screws 28a by an instantaneous adhesive agent.

First, the sensor device 20, to which the coaxial line 21 for outputting an electrical signal was soldered, was stuck onto the jig 22. Then, the sensor device 20 was screwed between the jigs 22 and 23 by using the bolts 25, so that the sensor device 20 was sandwiched therebetween (hereunder, this member referred to as a "fixing member").

On the other hand, the jig 26 and the vibrator 28 of the vibration testing machine were fixed to each other by being screwed to each other by the use of the bolts 27. The jig 26 was adjusted by a spirit level in such a way as to be in a horizontal position.

Subsequently, the clearance holes 22b and 23b of the fixing member 30 were aligned with the female screws 26b of the jig 26. Then, the fixing member 30 was screwed to the jig 26 by using the bolts 24. Thus, the sensor device 20 and the vibrator 28 of the vibration testing machine were fixed.

Additionally, in the case of vibrating the sensor device 20 in the direction of X-axis or Y-axis, the fixing member 30 was mounted on the side surface of the jig 26. Thus, a dummy jig 29 having the same shape and weight as those of the fixing member 30 was screwed and fixed onto a surface of the jig 26 opposite to the surface thereof, onto which the fixing member 30 was mounted. Consequently, the balance in weight was maintained.

(ii) Calibration of Sensitivity

Figure 1A:
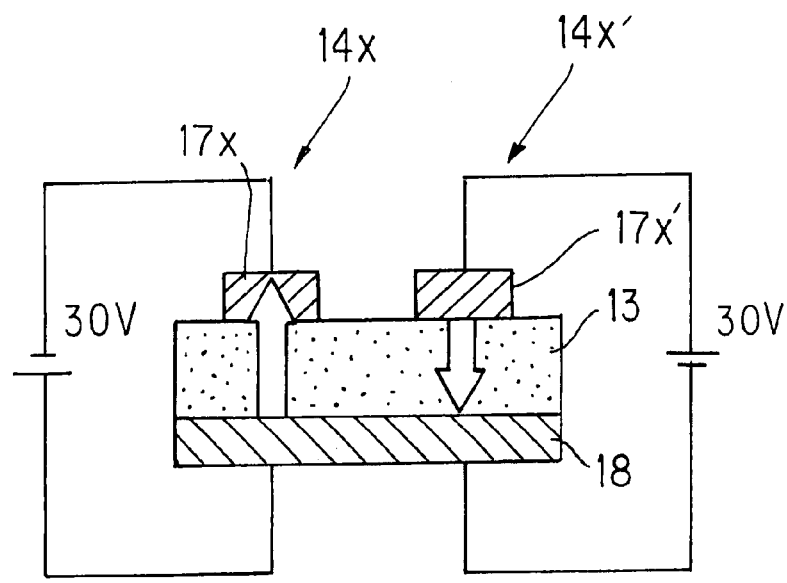
FIGS. 1A and 1B are diagrams illustrating an embodiment of a method for calibrating the sensitivity of an acceleration sensor device according to the present invention.

First, the sensor device 20 was fixed to the vibration testing machine, as described above. Then, as illustrated in FIG. 1A, the piezoelectric elements 14x and 14x' of the pair of the acceleration detecting device corresponding to X-axis were connected through the coaxial line to a power supply for polarization. Subsequently, a voltage of 30 V, which was the saturated polarization voltage, was applied by iteratively performing turning-on and turning-off operations three times (namely, a saturation polarization processing was performed).

Subsequently, the excitation (or oscillation) of the sensor device in the direction of Z-axis was performed at an oscillation frequency of 80 Hz. Then, the vibration of the vibration testing machine was adjusted by using the standard pickup fixed to the vibrator so that the acceleration (component) in the direction of Z-axis was 10 m/s$^2$. Thereafter, the electric outputs of the piezoelectric elements 14x and 14x' of the pair were independently measured.

As a result, it was found that the absolute values of the voltages respectively outputted from the piezoelectric elements 14x and 14x' were 278 mV and 257 mV, respectively.

Figure 1B:
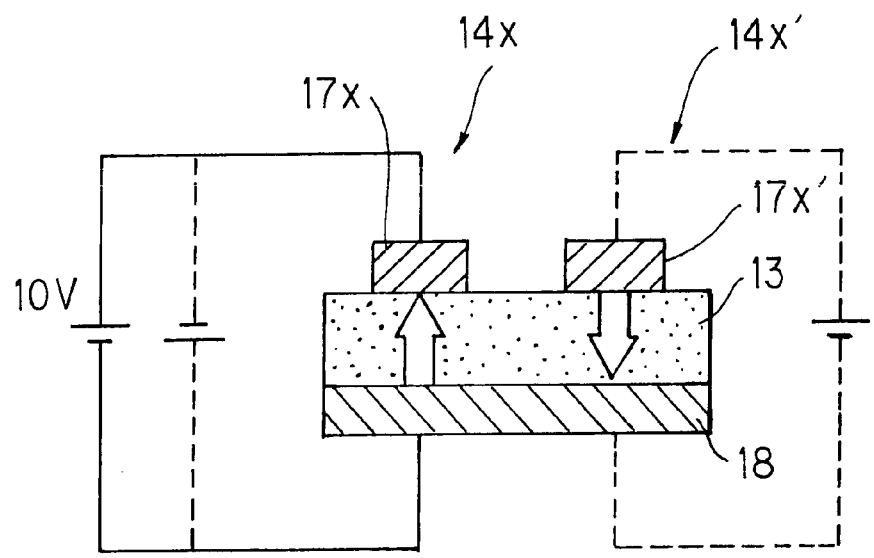

Furthermore, as illustrated in FIG. 1B, the reverse polarization processing was performed on the piezoelectric element 14x, whose measured voltage having a larger absolute value, by iteratively performing an operation of applying a voltage of 10 V, whose polarity was opposite to that of the polarization having been already present as a result of the saturation polarization, three times. Resultantly, it was found that the voltage outputted from the piezoelectric element 14x was 257 mV.

Namely, the electric outputs of the piezoelectric elements 14x and 14x' of the pair in the case of oscillating the sensor device in the direction of Z-axis were completely canceled. The noise sensitivity of the acceleration detecting device in the case of oscillating the device in the direction of Z-axis was calibrated as 0.

Second Embodiment

Figure 7:
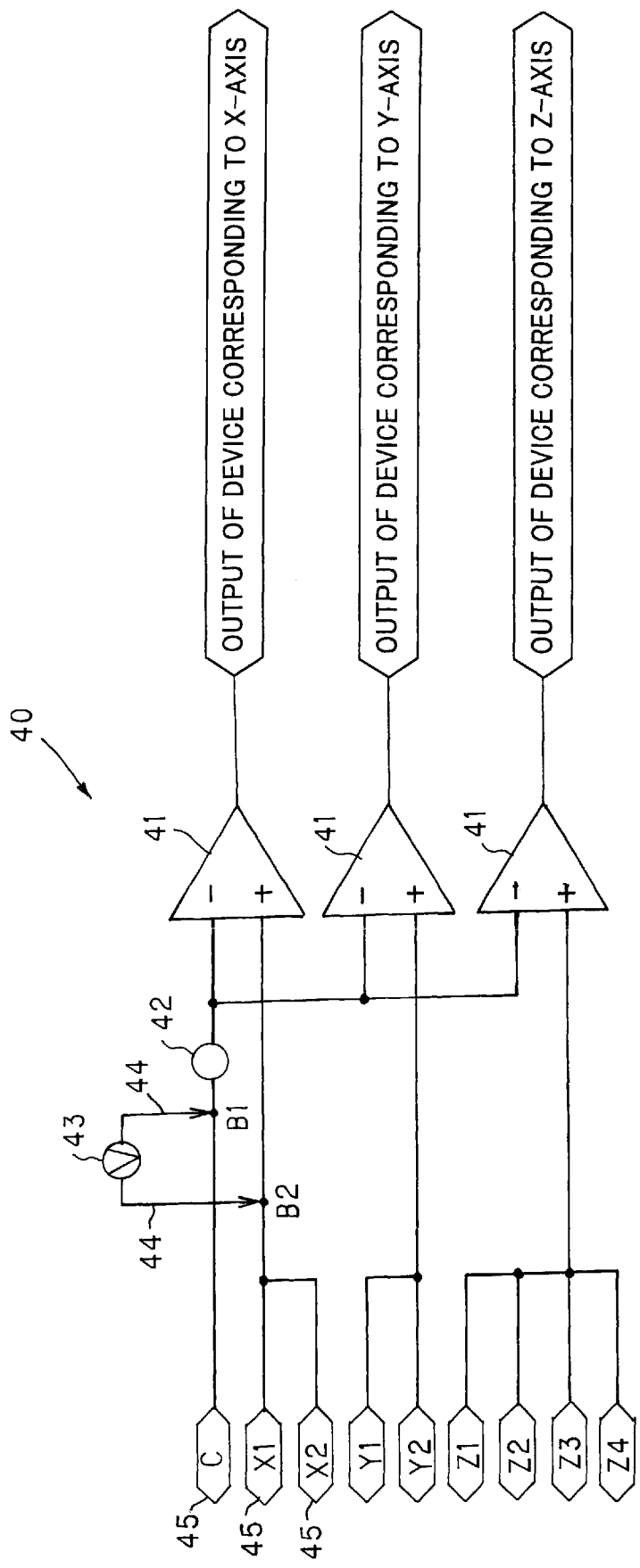
FIG. 7 is a schematic circuit diagram showing the structure of the sensor circuit used in the second embodiment of the present invention.

Usually, as shown in FIG. 7, the sensor device is used by being connected to a sensor circuit 40 having resistor components, capacitors and other necessary circuit components (not shown), which are disposed on a printed circuit board, in addition to the amplifying circuit 41 for amplifying electric signals sent from the piezoelectric elements.

The method for calibrating the sensitivity can be applied to the sensor device, even after incorporated into the sensor circuit. The second embodiment is an example in the case of measuring the electric outputs of the entire acceleration detecting device that was in a state in which the sensor device 20 of FIG. 6 was incorporated into the sensor circuit 40 of FIG. 7, and then calibrating the sensitivity thereof.

Figure 8A:
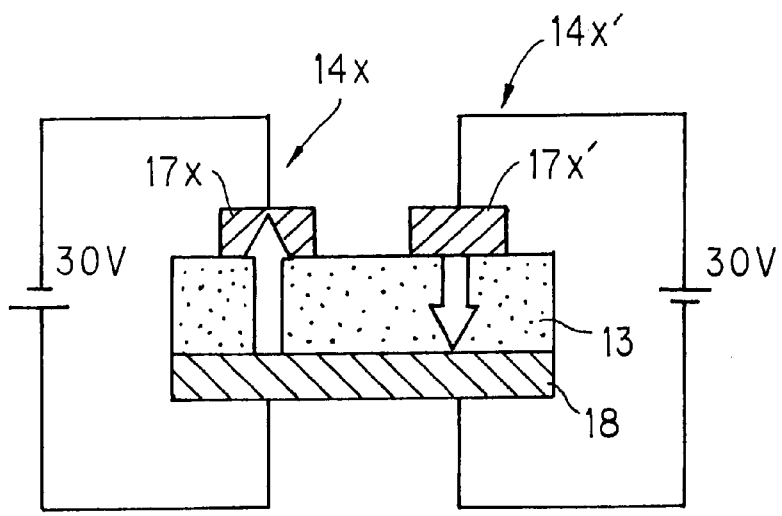
FIGS. 8A and 8B are diagrams illustrating other embodiments of the method for calibrating the sensitivity of an acceleration sensor device according to the present invention.
Figure 8B:
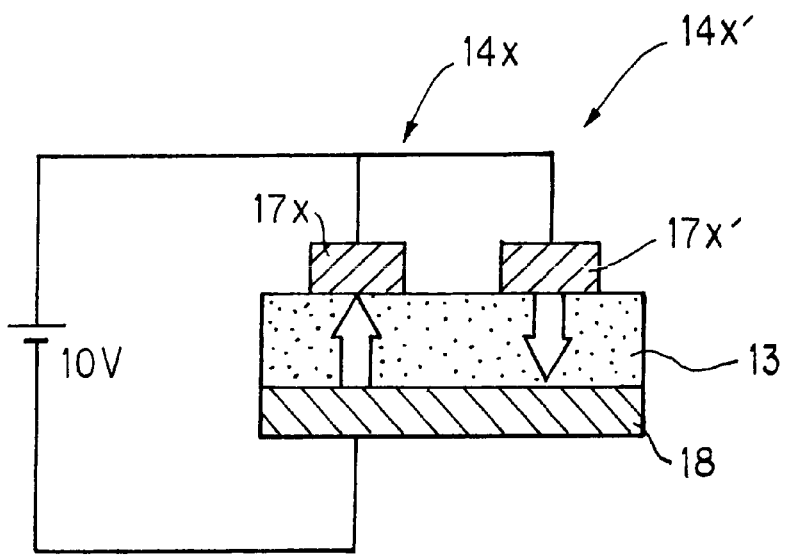

First, similarly as in the case of the first embodiment, the saturation polarization of the piezoelectric elements 14x and 14x' of the pair constituting the acceleration detecting device corresponding to X-axis of the sensor device was performed, as illustrated in FIG. 8. Subsequently, the sensor device 20 of FIGS. 6A and 6B was bonded to a circuit board having the sensor circuit 40 of FIG. 7. Bonding pads 19 of the sensor device 20 were electrically connected to bonding pads 45 corresponding to the sensor circuit 40 by wire bonding.

Then, the circuit board, to which the sensor device was bonded, was fixed to the vibration testing machine by performing a method similar to that performed in the first embodiment. Subsequently, the sensor device was oscillated in the direction of X-axis. Then, the voltage outputted from the acceleration detecting device corresponding to X-axis was measured. The voltage outputted from the acceleration detecting device corresponding to X-axis (namely, a sum of the voltages outputted from the piezoelectric elements 14x and 14x') was 622 mV (which was the principal axis sensitivity).

Furthermore, the sensor device was then oscillated in the direction of Z-axis. Then, the voltage outputted from the acceleration detecting device corresponding to X-axis was measured. The voltage outputted from the acceleration detecting device corresponding to X-axis was 55 mV (which was the noise sensitivity). Namely, a ratio of the noise sensitivity, which was 55 mV, to the principal axis sensitivity, which was 622 mV, was 8.8% and thus exceeded an ordinary target value, which was 5%.

Thus, the polarization trimming processing was performed by carrying out the following operations.

First, as illustrated in FIG. 7, a part of the circuit was shut off by the switch 42. Thus, the probe 44 connected to the power supply 43 for reverse-polarization was brought into contact with a point B1, which was provided at the side of a lower electrode C, and with a point B2, which was provided at the side of upper electrodes X1 and X2.

Namely, as shown in FIG. 8, the probe was connected so that a voltage of 10V having a polarity opposite to that of the polarization, which was already present, was applied to the piezoelectric element 14x and a voltage of 10V having the same polarity as that of the polarization, which was already present, was simultaneously applied to the piezoelectric element 14x' by energizing the entire acceleration detecting device, instead of energizing the piezoelectric elements individually.

Then, the reverse polarization was performed by applying the voltage of 10 V for a time period of 1 second once during the device was in such a connecting state. Thereafter, the circuit board, to which the sensor device was bonded, was oscillated again in the direction of X-axis. Then, the voltage outputted from the acceleration detecting device corresponding to X-axis was measured. The output voltage was 614 mV (which was the primary axis sensitivity).

Further, the sensor device was then oscillated in the direction of Z-axis. The voltage outputted from the acceleration detecting device corresponding to X-axis was measured. The output voltage was 18 mV (which was the noise sensitivity). Namely, a ratio of the noise sensitivity, which was 18 mV, to the principal axis sensitivity, which was 614 mV, was 2.9%. Then, the ratio was calibrated as the ordinary target value, which was within 5%.

In the case of the method of the second embodiment, the piezoelectric element 14x' was in the saturated polarization state. Thus, even when the voltage of the same polarity was applied thereto, the polarizability thereof does not change. On the other hand, the voltage of the polarity opposite to that of the polarization at the time of the saturated polarization was applied to the piezoelectric element 14x. Thus, the polarizability thereof can be lowered.

Incidentally, the method of shutting off a part of the circuit by a switch according to the second embodiment of the present invention is effective in the case of applying a voltage higher than absolute maximum rating of circuit components of a circuit board thereto. In this case, the amplifying circuit portion 41 is preliminarily put into a state in which this portion 41 can be electrically separated by the turning-on or turning-off of the switch 42 from the rest of the circuit. When the voltage is applied thereto, the switch 42 is turned off. When the noise sensitivity is measured, the switch 42 is turned on. Additionally, a detachable chip (namely, a chip resistor having a resistance of about 0 Ω) for a jumper may be placed instead of the switch, and detached therefrom as occasion arises.

As described above, according to the method for calibrating the sensitivity of an acceleration sensor device having an acceleration detecting device, electric outputs of a pair of piezoelectric elements of the acceleration detecting device can be canceled more completely by bringing the absolute values of the electric outputs of the piezoelectric elements close to each other. Consequently, the noise sensitivity of the acceleration sensor device can be suppressed.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A method for calibrating sensitivity of an acceleration sensor device capable of detecting an externally acting acceleration by at least one acceleration detecting device comprising a pair of piezoelectric elements, said method including the steps of:

applying oscillation to said acceleration sensor device; and applying a voltage of a polarity, which is opposite to a polarity of polarization being already present therein, to one of said piezoelectric elements of the pair, whose electric output has an absolute value larger than an absolute value of an electric output of the other piezoelectric element of the pair, to thereby bring the absolute value of the electric output of one of said piezoelectric elements of the pair close to that of the electric output of the other piezoelectric element of the pair.

2. The method for calibrating sensitivity of an acceleration sensor device according to claim 1, wherein an acceleration sensor device comprising at least one acceleration detecting device is employed as an acceleration sensor device having sensitivity to be calibrated, and wherein said acceleration detecting device comprises:

a weight;

supports, installed around said weight, each having a hollow portion;

a flexible substrate put on said supports so that said weight is suspended in said hollow portion of each of said supports; and a pair of piezoelectric elements.

3. The method for calibrating sensitivity of an acceleration sensor device according to claim 1, wherein an acceleration sensor device comprising acceleration detecting devices respectively corresponding to two orthogonal axes among orthogonal X-axis, Y-axis, and Z-axis is employed as an acceleration sensor device having sensitivity to be calibrated.

4. The method for calibrating sensitivity of an acceleration sensor device according to claim 2, wherein an acceleration sensor device comprising acceleration detecting devices respectively corresponding to two orthogonal axes among orthogonal X-axis, Y-axis, and Z-axis is employed as an acceleration sensor device having sensitivity to be calibrated.

5. The method for calibrating sensitivity of an acceleration sensor device according to claim 1, wherein an acceleration sensor device comprising acceleration detecting devices respectively corresponding to three orthogonal X-axis, Y-axis, and Z-axis is employed as an acceleration sensor device having sensitivity to be calibrated.

6. The method for calibrating sensitivity of an acceleration sensor device according to claim 2, wherein an acceleration sensor device comprising acceleration detecting devices respectively corresponding to three orthogonal X-axis, Y-axis, and Z-axis is employed as an acceleration sensor device having sensitivity to be calibrated.

7. The method for calibrating sensitivity of an acceleration sensor device according to claim 1, which further comprises the steps of:

preliminarily calculating relation among a value of a voltage, a time period, during which the voltage is applied to said piezoelectric element, and magnitude of polarization changed by applying the voltage thereto when the voltage of the polarity opposite to the polarity of the polarization being already present therein; and determining the value of the voltage to be applied thereto, and the time period, during which the voltage is applied thereto.

8. The method for calibrating sensitivity of an acceleration sensor device according to claim 2, which further comprises the steps of:

preliminarily calculating relation among a value of a voltage, a time period, during which the voltage is applied to said piezoelectric element, and magnitude of polarization changed by applying the voltage thereto when the voltage of the polarity opposite to the polarity of the polarization being already present therein; and determining the value of the voltage to be applied thereto, and the time period, during which the voltage is applied thereto.

9. The method for calibrating sensitivity of an acceleration sensor device according to claim 1, which further comprises the step of:

simultaneously applying the voltage of the polarity, which is opposite to the polarity of the polarization being already present therein, to said piezoelectric element, whose electric output has an absolute value larger than an absolute value of an electric output of the other piezoelectric element of each of the pairs, and a voltage of a same polarity as the polarity of the polarization, which is already present therein, to said piezoelectric element, whose electric output has a smaller absolute value, of a corresponding one of the pairs by energizing all of said acceleration detecting devices.

10. The method for calibrating sensitivity of an acceleration sensor device according to claim 2, which further comprises the step of:

simultaneously applying the voltage of the polarity, which is opposite to the polarity of the polarization being already present therein, to said piezoelectric element, whose electric output has an absolute value larger than an absolute value of an electric output of the other piezoelectric element of each of the pairs, and a voltage of a same polarity as the polarity of the polarization, which is already present therein, to said piezoelectric element, whose electric output has a smaller absolute value, of a corresponding one of the pairs by energizing all of said acceleration detecting devices.

* * * * *